(12) United States Patent
Desai

(10) Patent No.: US 11,005,776 B2
(45) Date of Patent: *May 11, 2021

(54) RESOURCE ALLOCATION USING RESTORE CREDITS

(71) Applicant: EMC IP Holding Company LLC, Hopkinton, MA (US)

(72) Inventor: Keyur B. Desai, Cary, NC (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/836,350

(22) Filed: Mar. 31, 2020

(65) Prior Publication Data

US 2020/0228461 A1 Jul. 16, 2020

Related U.S. Application Data

(63) Continuation of application No. 16/154,518, filed on Oct. 8, 2018, now Pat. No. 10,630,602.

(51) Int. Cl.
*H04L 12/911* (2013.01)
*G06F 11/14* (2006.01)
(Continued)

(52) U.S. Cl.
CPC ........ *H04L 47/783* (2013.01); *G06F 11/1464* (2013.01); *G06F 11/1469* (2013.01);
(Continued)

(58) Field of Classification Search
CPC ... H04L 47/783; H04L 47/805; H04L 47/822; H04L 67/2842; H04L 67/10; H04L 67/42;
(Continued)

(56) References Cited

U.S. PATENT DOCUMENTS 5,453,982 A 9/1995 Pennington et al.
5,586,121 A 12/1996 Moura
(Continued)

FOREIGN PATENT DOCUMENTS

EP 3350702 A1 7/2018
WO 2005-079001 8/2005
(Continued)

OTHER PUBLICATIONS

International Search Report for PCT/US2019/043976 dated Sep. 18, 2019.
(Continued)

*Primary Examiner* — Michael Won
(74) *Attorney, Agent, or Firm* — Workman Nydegger

(57) ABSTRACT

Systems and methods for allocating resources are disclosed. Resources such as streams are allocated using restore credits. Credits are issued to the clients in a manner that ensure the system is operating in a safe allocation state. The credits can be used not only to allocate resources but also to throttle clients where necessary. Credits can be granted fully, partially, and in a number greater than requested. Zero or negative credits can also be issued to throttle clients. Restore credits are associated with reads and may be allocated by determining how many credits a CPU/cores can support. This maximum number may be divided amongst clients connected with the server.

20 Claims, 7 Drawing Sheets

(51) Int. Cl.
*H04L 12/927* (2013.01)
*H04L 29/08* (2006.01)
*H04L 29/06* (2006.01)

(52) U.S. Cl.
CPC .......... *H04L 47/805* (2013.01); *H04L 47/822* (2013.01); *H04L 67/2842* (2013.01); *H04L 67/10* (2013.01); *H04L 67/42* (2013.01)

(58) Field of Classification Search
CPC ............... H04L 47/70; H04L 29/08288; H04L 29/06054; H04L 29/08144; H04L 67/1002; G06F 11/1464; G06F 11/1469; G06F 9/5011; G06F 9/5083; G06F 9/5027; G06F 3/1239
USPC ................ 709/213, 219, 225, 226, 229, 232
See application file for complete search history.

(56) References Cited

U.S. PATENT DOCUMENTS

| | | | |
|---|---|---|---|
| 5,778,320 A | 7/1998 | Drozt et al. | |
| 5,812,545 A | 9/1998 | Liebowitz et al. | |
| 5,956,321 A | 9/1999 | Yao et al. | |
| 6,438,141 B1 | 8/2002 | Hanko et al. | |
| 6,459,901 B1 | 10/2002 | Chawla et al. | |
| 6,467,024 B1 | 10/2002 | Bish | |
| 6,502,165 B1 | 12/2002 | Kishi | |
| 7,269,697 B1 | 9/2007 | Reeve | |
| 7,461,236 B1 | 12/2008 | Wentzlaff | |
| 7,478,158 B1* | 1/2009 | Rodgers | H04L 12/14 370/310 |
| 7,539,735 B2 | 5/2009 | Fruchtman | |
| 7,583,658 B1 | 9/2009 | Wang et al. | |
| 7,698,115 B2 | 4/2010 | Voellm et al. | |
| 7,707,248 B2 | 4/2010 | Simard et al. | |
| 8,306,036 B1 | 11/2012 | Bollay | |
| 8,381,217 B1 | 2/2013 | Wijayaratne et al. | |
| 8,400,924 B2 | 3/2013 | Wang | |
| 9,619,127 B2 | 4/2017 | Varner et al. | |
| 10,652,796 B2 | 5/2020 | Laliberte | |
| 2002/0053011 A1 | 5/2002 | Aiken et al. | |
| 2004/0139207 A1* | 7/2004 | de Jong | H04W 12/0013 709/229 |
| 2004/0165598 A1 | 8/2004 | Shrimali et al. | |
| 2004/0267932 A1 | 12/2004 | Voellm et al. | |
| 2006/0179182 A1 | 8/2006 | Chadha | |
| 2007/0015525 A1 | 1/2007 | Beming | |
| 2008/0034021 A1 | 2/2008 | De Spiegeleer | |
| 2008/0126606 A1 | 5/2008 | Wang | |
| 2008/0307094 A1* | 12/2008 | Karonen | H04L 67/104 709/226 |
| 2009/0138616 A1 | 5/2009 | Alvarez et al. | |
| 2009/0171812 A1 | 7/2009 | Fadell | |
| 2009/0178050 A1 | 7/2009 | Bichler et al. | |
| 2010/0031157 A1 | 2/2010 | Neer et al. | |
| 2011/0032947 A1 | 2/2011 | Brueggen | |
| 2011/0184998 A1 | 7/2011 | Palahnuk | |
| 2012/0327779 A1 | 12/2012 | Gell et al. | |
| 2013/0097680 A1 | 4/2013 | Bendapudi | |
| 2013/0122858 A1 | 5/2013 | Bedingfield et al. | |
| 2013/0191929 A1* | 7/2013 | Yin | H04L 63/0815 726/28 |
| 2013/0297857 A1 | 11/2013 | Sela | |
| 2014/0101113 A1 | 4/2014 | Zhang et al. | |
| 2014/0195688 A1 | 7/2014 | Archer | |
| 2015/0007189 A1 | 1/2015 | De et al. | |
| 2016/0005007 A1 | 1/2016 | Marsico | |
| 2017/0124737 A1 | 5/2017 | Joseph et al. | |
| 2017/0177253 A1 | 6/2017 | Hayes et al. | |
| 2017/0277620 A1 | 9/2017 | Kadioglu | |
| 2018/0077293 A1 | 3/2018 | Chai | |
| 2018/0097707 A1 | 4/2018 | Wright et al. | |
| 2018/0278647 A1 | 9/2018 | Gabaev et al. | |
| 2019/0004862 A1 | 1/2019 | Bemat | |
| 2019/0068515 A1 | 2/2019 | Seely | |
| 2019/0348158 A1 | 11/2019 | Livesay et al. | |
| 2020/0014804 A1 | 1/2020 | Pollak | |
| 2020/0112516 A1* | 4/2020 | Desai | H04L 47/39 |

FOREIGN PATENT DOCUMENTS

| | | |
|---|---|---|
| WO | 2008/118608 A1 | 10/2008 |
| WO | 2017/123335 A1 | 7/2017 |

OTHER PUBLICATIONS

International Search Report and Written Opinion dated Oct. 2, 2019 in corresponding PCT application PCT/US2019/043970.
International Search Report and Written Opinion issued in Application No. PCT/US2019/044209 dated Oct. 18, 2019.

* cited by examiner

RESOURCE ALLOCATION USING RESTORE CREDITS

FIELD OF THE INVENTION

Embodiments of the present invention relate to systems and methods for allocating resources. More particularly, embodiments of the invention relate to systems and methods for stream or resource allocation when performing data protection operations such as restore operations. Appendix A forms part of the present disclosure and is incorporated herein in its entirety by this reference.

BACKGROUND

In a single node or a distributed/scaleout cluster environment, allocating resources can be a challenging task. The task is further complicated when attempting to ensure that the resources are allocated fairly to all of the clients using the available resources. For example, any one client should not be able to have an unfairly large share of the available resources. At the same time, there is a need to satisfy quality of service (QOS) requirements.

More specifically, data protection operations (e.g., backup, restore) are often associated with resource allocation issues and quality of service (QOS) issues. These issues arise when some clients are using too many resources and other clients are therefore neglected or unable to acquire the necessary resources. In addition, the QOS often suffers when the demand for resources is more than the node or cluster can bear. To avoid this circumstance or to correct this circumstance, there is a need to throttle requests from any particular client at any particular time. Consequently, systems and methods are needed to fairly allocate resources while, at the same time, ensuring or meeting quality of service requirements.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for performing data protection operations. Examples of data protection operations include, but are not limited to, resource allocation operations including stream allocations, read allocations, segment processing allocations, or the like. Data protection operations may also include backup operations, restore operations, deduplication operations, mirroring operations, data replication operations, and the like or combination thereof.

Embodiments of the invention relate to systems and methods for allocating resources in a computing environment. Embodiments of the invention further relate to systems and methods for measuring and improving quality of service and for throttling clients in the context of resource allocation. Embodiments of the invention further relate to systems and methods for allocating streams to clients, allocating restore credits, for example when performing restore operations.

In one example, a cluster of servers (or a single server or node) may have resources that can be allocated to clients. These resources include streams, reads, writes, processing, deduplication, or the like. A particular server, for example, may be able to provide x number of streams, or a certain number of reads/writes. As a whole, the cluster can also provide a larger number of streams, reads/writes, and processing. Embodiments of the invention relate to systems and methods for allocating these resources.

Figure 1:
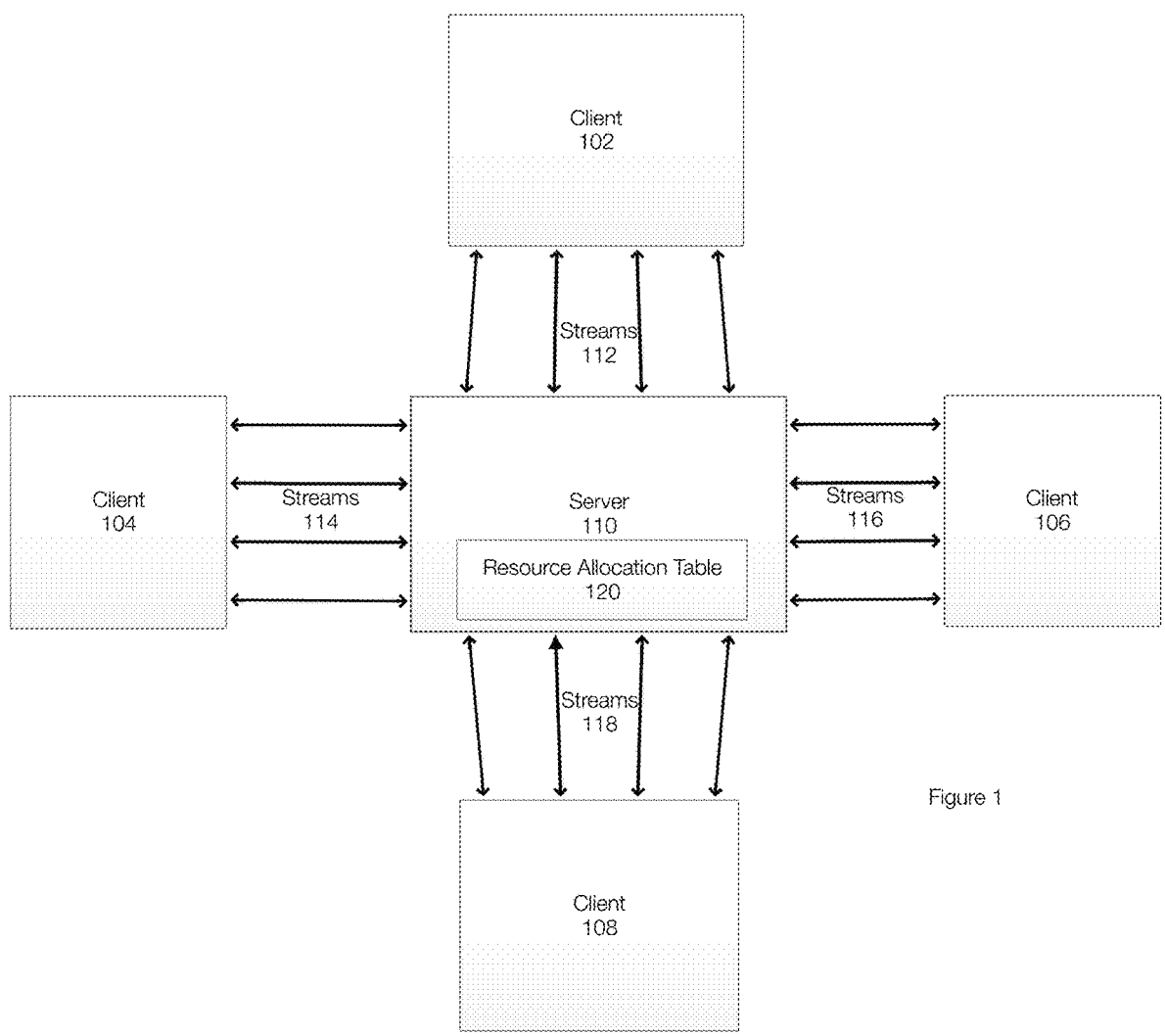
FIG. 1 illustrates an example of a server configured to allocate resources to clients.

FIG. 1 illustrates an example of a computing environment in which clients communicate with a server (or a cluster). In this example, the resources allocated to the client include streams. A client may be able to establish multiple streams with multiple servers. Similarly, a server can establish multiple streams with multiple clients.

These resources (and/or other resources including read resources, write resources, processing resources, etc.) are allocated such that the server of cluster operates in a safe allocation state. A safe allocation state is one in which all of the resource requests can be granted and serviced until completion. This is achieved using a credit system. In order to account for multiple scenarios, there are different types of credits that can be granted. Each type, however, may relate to the resources being allocated. The different types of credits effectively represent a different response to credit requests. The credit system can be used to allocate different types of resources and/or to allocate multiple resources at the same time.

For example, the number of credits granted by the server or cluster may be equal to the number of credits requested, less than the number of credits requested, greater than the number of credits requested, zero, or negative. Issuing zero or negative credits allows the server to fully use resources but also throttle when necessary. This also allows the server or cluster to recover from an unsafe state and return to a safe allocation state. By way of example, the credits may be described as follows:

Prefetch credits: More than the number of credits requested by clients.

Partial credits: Less than (but greater than 0) number of credits requested by clients.

Equal credits: Equal to the number of credits requested by clients.

Zero credits: Equal to zero, indicating, current client request cannot be processed. The client needs to wait and retry obtaining credits.

Negative credits: A negative number, indicating to the client to release the number of cached credits.

The zero and negative credits allow the server to throttle a request from a client.

FIG. 1 illustrates a server (e.g., a data protection or backup server) 110 that provides resources to clients, represented by clients 102, 104, 106 and 108. The server 110 may also represent a cluster of nodes or servers. In one example, the clients 102, 104, 106 and 108 are streaming data (e.g., backup data or streams, restore streams, streams that include data for processing such as deduplication, etc.) to/from the server 110. The client 102, for example, may be backing up a plurality of virtual machines, a database, a file system, or other data type using streams 112. Similarly, the client 104 is associated with streams 114, the client 106 is associated with streams 116, and the client 108 is associated with streams 118.

In this example, the server 110 is configured to allocate streams to the clients 102, 104, 106 and 108. The server 102 is configured to perform stream allocation using, in one example, stream credits. The stream credits can be managed using a resource allocation table 120 that allows the state of allocation (e.g., safe, unsafe) to be determined. Whenever credits are issued (regardless of type), the allocation table 120 is updated so that subsequent requests can be evaluated.

In one example, a request for stream credits is evaluated to determine whether granting the request results in a safe allocation state. Generally, the request is granted if the resulting allocation state is safe. If the request results in an unsafe allocation state, then the request is denied, for example by issuing zero credits or by issuing negative credits.

In the following disclosure and by way of example only, it is assumed that 1 stream available is associated with 1 stream credit granted. In other words and by way of example only, 1 credit represents 1 stream. Other credit per resource allocation schemes could be different. A server may grant x number of streams per credit, for example. The server 110 may grant a stream credit to a requesting client if it is possible for all streams associated with all clients to finish executing.

Because the server 110 may not know when a particular client stream will terminate or how may more stream credits different clients will have requested by the time that the particular client stream finishes, the server 110 may assume that all clients will eventually attempt to acquire their maximum allowed stream credits, use the stream credits, and then release the stream credits.

On these assumptions, the server may determine if the stream allocation state is safe by finding a hypothetical set of stream credit requests by the clients that would allow each client to acquire its maximum requested stream credits and use the stream credits. If there is a state where no such set exists, this may result in the server 110 granting zero stream credits or negative stream credits. This may cause clients that receive these grants or requests to return any stream credits being held. Stated differently, the ability to grant or issue zero credits or negative credits allows the clients to be throttled. In one example, the client may self-throttle because they may not have sufficient credits or because they may need to return credits to the server 110. In this manner, the server then attempts to get back to a safe stream allocation state in order to grant the requested credits.

Embodiments of the invention may allocate resources when the allocation state of the system resulting from a particular allocation is safe. If the proposed allocation results in an unsafe state, then the allocation may be made to return the system to a safe allocation state (e.g., by issuing negative or zero credits). The following discussion, with regard to stream credits, includes the following. This allocation method is described in more detail with regard to FIGS. 3B and 3C described below.

In one example, let C be the number of clients in the system and N be the number nodes or servers in the system.

Total (Maximum Streams) Availability Matrix (TAM): A matrix of length N indicating a maximum number of available stream resources for each node.

TAM[j]=k, there are k instances of stream resource Rj available.

Current Allocation Matrix (CALM): A C×N matrix that defines the number of stream resources currently allocated to each client.

CALM[i,j]=k, then client Ci is currently allocated k instances of stream resource Rj.

Current Availability Matrix (CAM): A matrix of length N indicating the current number of streams available for each node type. This is determined by adding currently allocated streams for all the clients on each individual nodes and subtracting the result from the total maximum streams for that node.

$$CAM[j]=TAM[j]-(CALM[C0]+CALM[C1]+ \ldots + CALM[CN]);$$

Current Demand Matrix (CDM): An C×N matrix that defines the current demand or the point in time maximum requested streams.

If CDM[i,j]=k, then client Ci may request at most k instances of stream resource Rj.

Current Need Matrix (CNM): A C×N matrix indicates the stream credit needs for each clients. (Need=Demand−Allocated).

$$CNM[i,j]=CDM[i,j]-CALM[i,j].$$

At any point of time, the server determines if it is safe to allocate stream credits in response to the client credits requested. The system is in safe state, if at a given point in time, all client credit requests can be satisfied, i.e. for all clients, their stream resource needs are less that the current streams availability for all the nodes in a system.

$$CNM[i,j]<CAM[j]$$

If stream needs of a client is greater than the streams available (CNM[i, j]>CAM[j]), the system is considered unsafe (unsafe allocation state) and negative or zero credits are granted to clients and an effort is made to bring the system to safe/stable stream allocation state.

Figure 2:
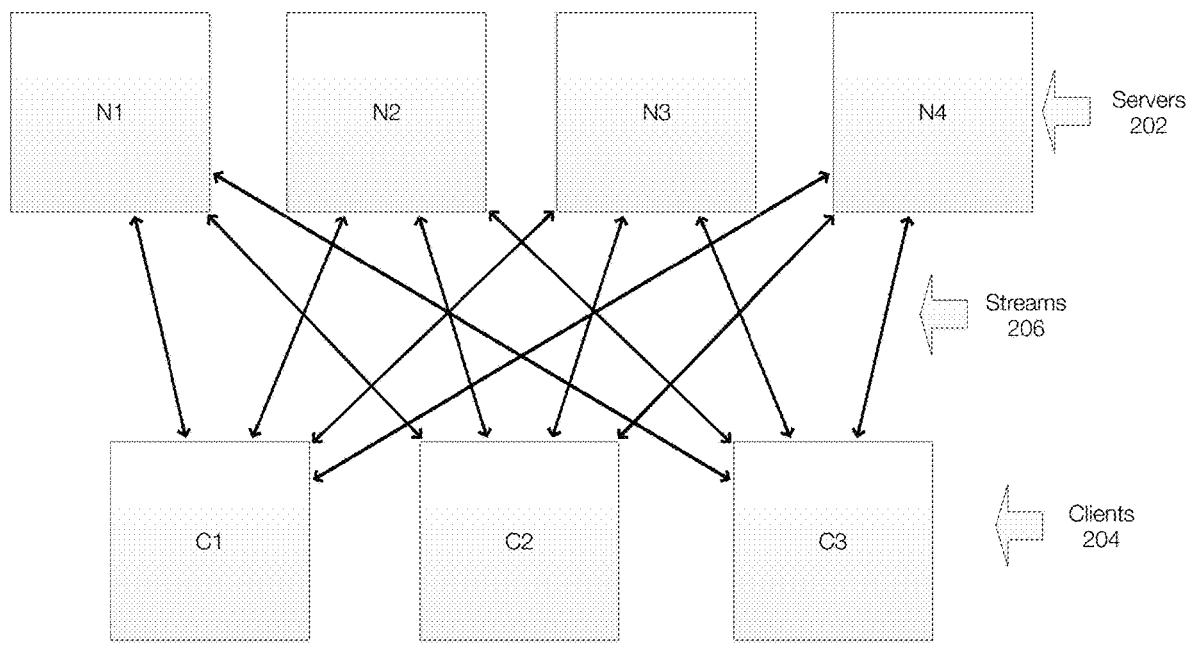
FIG. 2 further illustrates resource allocation including stream allocation in the context of cluster or server resources.

The following examples illustrate this process in more detail. FIG. 2 illustrates a cluster that includes nodes or servers 202 and clients 204. More specifically, FIG. 2 illustrates four nodes or servers: N1, N2, N3 and N4. FIG. 2 also illustrates clients C1, C2 and C3 (clients 204) that use resources of the servers 202. In this example, the resources of the servers 202 allocated to the clients 204 includes streams 206. The streams 206 may include backup streams, restore streams, or other data streams.

As an example, let us assume that in FIG. 2, the TAM or total maximum streams available on each of the nodes is represented as follows:

| N1 | N2 | N3 | N4 |
|----|----|----|----|
| 60 | 50 | 70 | 60 |

Thus, N1 has 60 streams for allocation to clients. Similarly, N2, N3 and N4 have 50, 70 and 60 streams, respectively, for allocation to clients.

The total maximum streams can be determined by considering the number of processors and cores on a server and by determining how much processing power a stream consumes. The total maximum streams can be determined in other ways, such as by testing or by user input.

The CALM matrix below indicates the stream credits that have already been allocated to the client C1-C3. In this example, assume that clients C1, C2 and C3 have the following stream credits already allocated to them.

|    | N1 | N2 | N3 | N4 |
|----|----|----|----|----|
| C1 | 10 | 20 | 20 | 10 |
| C2 | 10 | 00 | 30 | 30 |
| C3 | 10 | 20 | 10 | 00 |

CALM

The CAM or the current streams available (or streams that have not been allocated) can be calculated from the TAM and CALM above. For example: Node N1 has 60 maximum streams that it can allocate from the TAM matrix above. Node N1 has already allocated 10 streams to C1, C2 and C3 respectively. So total streams currently available on N1 is CAM[$N1$]=TAM[$N1$]−(CALM[0,$C1$]+CALM[0,$C2$]+CALM[0,$C3$]) i.e.

CAM[$N1$]=60−(10+10+10)=30.

Similarly,

CAM[$N2$]=50−(20+0+20)=10.

CAM[$N3$]=70−(20+30+10)=10.

CAM[$N4$]=60−(10+30+0)=20

| N1 | N2 | N3 | N4 |
|----|----|----|----|
| 60 | 50 | 70 | 60 |

TAM

−

|    | N1 | N2 | N3 | N4 |
|----|----|----|----|----|
| C1 | 10 | 20 | 20 | 10 |
| C2 | 10 | 00 | 30 | 30 |
| C3 | 10 | 20 | 10 | 00 |

CALM

=

| N1 | N2 | N3 | N4 |
|----|----|----|----|
| 30 | 10 | 10 | 20 |

CAM

More generally, the CAM identifies which nodes or servers are providing the streams allocated to the clients 204. As previously stated, The clients 204 can connect to any of the servers 202 and can therefore request credits from any of the servers 202 in the cluster.

The following CDM defines the maximum client stream credit request at a given point in time. In other words, the following matrix defines how many streams each client can request from each of the servers at a given point in time. These numbers or maximums can be predetermined and set by an administrator. Further, these numbers may be dynamic and may be based on the number of clients and/or the number of servers. As the numbers of servers and clients changed, the point in time stream credit request numbers may change.

|    | N1 | N2 | N3 | N4 |
|----|----|----|----|----|
| C1 | 30 | 30 | 20 | 20 |
| C2 | 10 | 20 | 30 | 40 |
| C3 | 10 | 30 | 50 | 00 |

CDM

By subtracting Current Allocated streams Matric (CALM) from Current Demand Matrix (CDM), the total stream credit needed or the CNM for C1, C2 and C3 can be determined as follows:

|    | N1 | N2 | N3 | N4 |
|----|----|----|----|----|
| C1 | 30 | 30 | 20 | 20 |
| C2 | 10 | 20 | 30 | 40 |
| C3 | 10 | 30 | 50 | 00 |

CDM

−

|    | N1 | N2 | N3 | N4 |
|----|----|----|----|----|
| C1 | 10 | 20 | 20 | 10 |
| C2 | 10 | 00 | 30 | 30 |
| C3 | 10 | 20 | 10 | 00 |

CALM

=

|    | N1 | N2 | N3 | N4 |
|----|----|----|----|----|
| C1 | 20 | 10 | 00 | 10 |
| C2 | 00 | 20 | 00 | 10 |
| C3 | 00 | 10 | 40 | 00 |

CNM

Using the above information, it is possible to determine whether each client can acquire and use its maximum requested stream credits. The following format is used in the following discussion <xx xx xx xx> represents streams associated with, respectively, nodes N1, N2, N3 and N4.

For example, from the CNM, C1 requests and acquires 20 N1 stream credits, 10 N2 stream credits and 10 N4 stream credits to achieve is maximum requested credits. The server may perform this determination prior to actually granting the request.

After C1 requests and acquires the available streams are now determined as follows:

<30 10 10 20> (CAM or available streams)−<20 10 00 10> (streams acquired by C1 to reach C1's max)=<10 00 10 10> (Streams still available)

Thus, the cluster still has 10 N1 streams, 00 N2 streams, 10 N3 streams and 10 N4 streams available.

Next, C1 terminates the processes associated with the streams and returns 30 N1, 30 N2, 20 N3 and 20 N4 stream credits back to the system. These are the streams associated with the C1 row in the CDM. Adding it to the streams currently available

<10 00 10 10>+<30 30 20 20>=<40 30 30 30>

As a result, the cluster now has 40 N1, 30 N2, 30 N3, and 30 N4 total streams available. This <40 30 30 30> is less than or equal to the TAM <60 50 70 60> or the total maximum stream for each node of the cluster i.e.

<40 30 30 30><=<60 50 70 60> so the system state is safe to allocate and to process next client request.

C2 now acquires 20 N1 streams and 10 N4 streams. C2 then terminates and returns all of its stream credits. In this example and after these steps, the available streams are or equals:

<40 30 30 30> (streams currently available prior to C2's request)−<00 20 00 10> (streams acquired by C2 to reach C2's max)=<40 30 30 30>−<00 20 00 10>=<40 10 30 20> (streams still available)+<10 20 30 40> (streams associated with the C2 row in the CDM)

<10 20 30 40>+<40 10 30 20>=<50 30 60 60> (streams available after C2 returns stream credits).

This <50 30 60 60> is less than or equal to the TAM <60 50 70 60> or the total maximum stream for each node of the cluster i.e.

<50 30 60 60> <=<60 50 70 60> so the system state is safe to allocate and process to process next client request.

Next, C3 acquires 10 N2 and 40 N3 streams, terminates and returns all streams (returns stream credits). This results in the following:

<50 30 60 60> (currently available streams prior to C3's)−<00 10 40 00> (streams acquired by C3 to reach C3's max)+<10 30 50 00> (streams returned by C3)=<60 50 70 60> (stream credits available).

This <60 50 70 60> is less than or equal to the TAM <60 50 70 60> or the total maximum stream for each node of the cluster i.e.

<60 50 70 60> <=<60 50 70 60> so the system state is safe to allocate and process to process next client request.

This demonstrates that because it is possible for each client to acquire its maximum requested stream credits and use the stream credits, the stream allocation states are safe and stream credits can be granted to all clients as described above.

A stream allocation safe state indicates that stream credits can be granted or issued. Embodiments of the invention contemplate several different kinds of credits that can be requested and granted.

The following examples illustrate these types of credits and illustrates whether the credits are granted.

Example 1: A Server Grants "Equal" Credits

Starting in the same state as the previous example started in, assume C3 requests 10 streams credits on node N3. In this example, there are enough available streams such that the credit request can be granted. After the grant, the new stream allocation state is as follows:

CAM or the Available streams on nodes:

|  | N1 | N2 | N3 | N4 |
|---|---|---|---|---|
| Available Streams | 30 | 10 | 00 | 20 |

The CALM streams currently allocated to the clients 204 is now as follows (this assumes that C3's request for 10 N3 credits is granted):

|  | N1 | N2 | N3 | N4 |
|---|---|---|---|---|
| C1 | 10 | 20 | 20 | 10 |
| C2 | 10 | 00 | 30 | 30 |
| C3 | 10 | 20 | 20 | 00 |

CALM

Now, the clients maximum requested streams is as follows:

|  | N1 | N2 | N3 | N4 |
|---|---|---|---|---|
| C1 | 30 | 30 | 20 | 20 |
| C2 | 10 | 20 | 30 | 40 |
| C3 | 10 | 30 | 50 | 00 |

CDM

With this information, a determination can be made as to whether the new stream allocation state is safe.

|  | N1 | N2 | N3 | N4 |  |  | N1 | N2 | N3 | N4 |  |
|---|---|---|---|---|---|---|---|---|---|---|---|
| C1 | 30 | 30 | 20 | 20 |  | C1 | 10 | 20 | 20 | 10 |  |
| C2 | 10 | 20 | 30 | 40 | − | C2 | 10 | 00 | 30 | 30 | = |
| C3 | 10 | 30 | 50 | 00 |  | C3 | 10 | 20 | 20 | 00 |  |

CDM   CALM

|  | N1 | N2 | N3 | N4 |
|---|---|---|---|---|
| C1 | 20 | 10 | 00 | 10 |
| C2 | 00 | 20 | 00 | 10 |
| C3 | 00 | 10 | 30 | 00 |

CNM

In the above example, C1 can acquire 20 N1, 10 N2 and 10 N4 streams, use them and release them. Then, C2 can acquire 20 N2 and 10 N4 streams, use them and release them. Finally, C3 can acquire 10 N2 and 30 N3 streams, use them and then release them. Therefore, this new allocation state is safe.

Because the new state is safe, the request from C3 for 10 streams credits on node N3 is granted. This is an example of a server granting stream credits equal to the number of stream credits requested by the client.

Example 2: Server Grants "Partial" Credits

Starting in the same state that the previous example started in, assume C3 requests 20 streams credits on N3. In this example, the streams available before granting the requested stream credits is as follows:

| N1 | N2 | N3 | N4 |
|---|---|---|---|
| 30 | 10 | 10 | 20 |

The streams available after granting the stream credits is as follows:

|    | N1 | N2 | N3  | N4 |
|----|----|----|-----|----|
|    | 30 | 10 | −10 | 20 |

Because the number of total streams available after the grant is less than zero, the server may decide to grant 10 stream credits (which is a partial grant because 20 stream credits were requested). As previously stated with respect to the previous example, granting 10 stream credits to C3 from N3 results in a safe allocation state. This illustrates an example of a partial grant of stream credits.

Example 3: "Zero" or "Negative" Stream Credit Allocation

From the previous starting state, assume that client C2 requests 10 stream credits from node N2. In this example, there are enough streams to grant stream credits. Assuming that the request is granted, the new state would be:
CAM or the Available streams on nodes:

|                   | N1 | N2 | N3 | N4 |
|-------------------|----|----|----|----|
| Available Streams | 30 | 00 | 10 | 20 |

The CALM or currently allocated streams according to the initial state:

|    | N1 | N2 | N3 | N4 |
|----|----|----|----|----|
| C1 | 10 | 20 | 20 | 10 |
| C2 | 10 | 10 | 30 | 30 |
| C3 | 10 | 20 | 10 | 00 |

CALM

The CDM or the point in time maximum requested streams is determined as follows:

|    | N1 | N2 | N3 | N4 |
|----|----|----|----|----|
| C1 | 30 | 30 | 20 | 20 |
| C2 | 10 | 20 | 30 | 40 |
| C3 | 10 | 30 | 50 | 00 |

CDM

Now a determination is made to determine if the new allocation state is safe. Assuming that clients C1, C2 and C3 request more stream credits from N2 and N3.

|    | N1 | N2 | N3 | N4 |          |    | N1 | N2 | N3 | N4 |   |
|----|----|----|----|----|----------|----|----|----|----|----|---|
| C1 | 30 | 30 | 20 | 20 |          | C1 | 10 | 20 | 20 | 10 |   |
| C2 | 10 | 20 | 30 | 40 | −        | C2 | 10 | 10 | 30 | 30 | = |
| C3 | 10 | 30 | 50 | 00 |          | C3 | 10 | 20 | 10 | 00 |   |

CDM                                              CALM

|    | N1 | N2 | N3 | N4 |
|----|----|----|----|----|
| C1 | 20 | 10 | 00 | 10 |
| C2 | 00 | 10 | 00 | 10 |
| C3 | 00 | 10 | 40 | 00 |

CNM

In this case, C1 is unable to acquire enough streams from N2 i.e. from the CNM above, it needs 10 streams from N2. However, according to the CAM above, the number of streams available for N2 is 0. Also, C2 is unable to acquire enough streams from N2, and C3 is unable to acquire enough streams from N2.

None of the clients in this example can acquire enough stream credits to achieve their maximum allowed stream credits. As a result, this state is not safe and the server 202 may throttle one or more of the clients 204 and recover from the unsafe allocation state by issuing negative credits. In other words, the servers 202 recover from this unsafe state by throttling and issuing negative credits.

For example, the server N2 may grant negative 20 stream credits to C1. Optionally, N2 grants zero credits to clients C2 and C3 (i.e., clients C2 and C3 throttle and retry their requests after some time). Client C1 returns the 20 stream credits it holds to N2 and the safe allocation state check is performed to determine if the state is safe.

Stream credits are used to perform resource allocation. The stream allocation method can be applied to many types of streams. The stream allocation method may maintain stable stream allocation states by granting negative/zero credits to various clients. Further, embodiments of the invention allow for different types of credit grants as previously described.

More specifically, stream credits may be prefetched. If a client holds no stream credits (or even if the client holds some stream credits) and if there are enough free streams on the server, the server can grant the client more credits then requested.

Prefetching credits may be requested, for example based on anticipated workloads. This may apply, for example, during a restore operation where the stream credits are used in anticipation of restoring a stream by reading a backup.

Granted credits can also be used to make decisions related to the sizing of the client size cache. This relates, for example, to reading ahead with stream credits used for the restore operation, performing an intelligent read ahead, or using credits to manage the cost of a solution.

A partial grant of credits can allow operations to be partially completed. Further, stream credits can be retrieved from the clients by issuing negative credits and flushing the number of negative credits from a client's cache. In other words, a client may be throttled if the number of granted credits is zero or negative. Further different credit allocation methods may be implemented based on the type of credits requested.

Figure 3A:
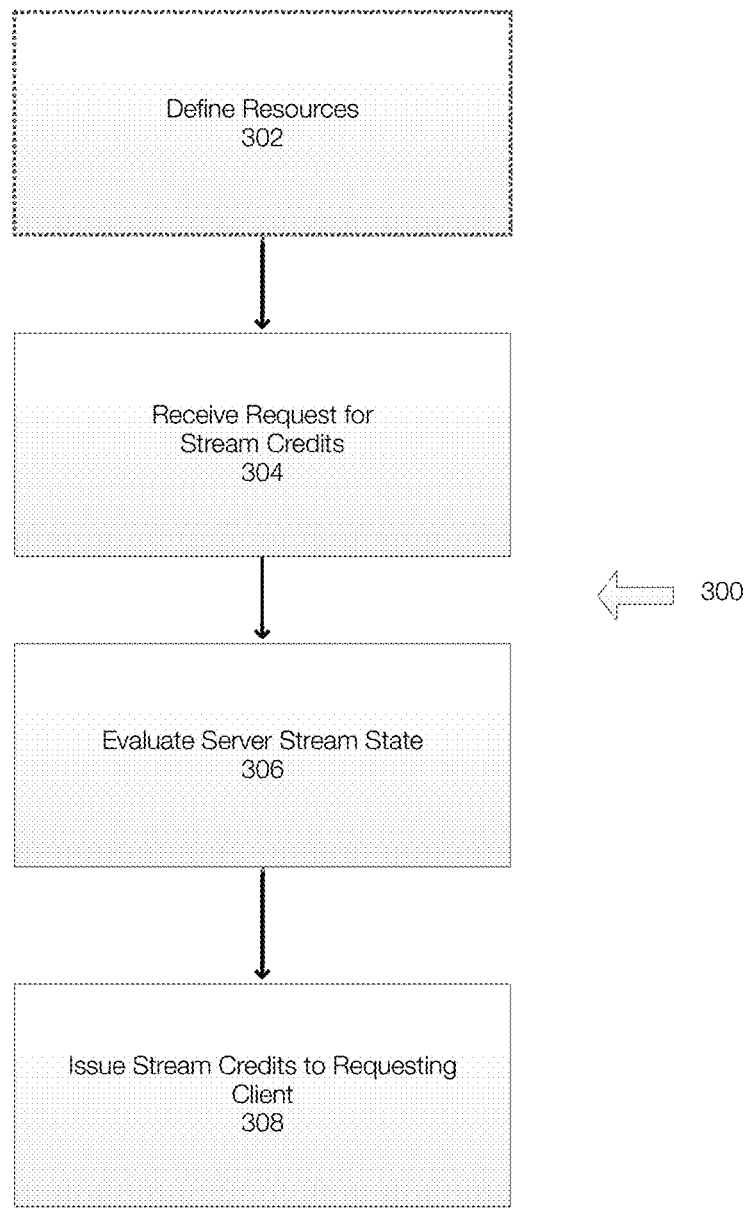
FIG. 3A illustrates an example of a method for performing resource allocation and in particular for allocating streams in a computing environment.

FIG. 3A illustrates an example of a method for performing resource allocation. In one example, various parameters associated with the resource allocation may be defined 302 or determined. For example, a determination may be made regarding how many streams each node or server can safely support. This may be based on number of processors/cores, memory, write/read parameters or the like. For example, a relationship between writes, processor or core consumption may be determined. If a predetermined number of writes or a data transmission rate consumes 1% of a CPU, then a stream at that transmission rate may correspond to 1 credit. Also, the maximum number of streams allowed per client may be determined.

This aspect of the method 300 may be performed at a single time. However, this aspect of the method 300 can be reevaluated as nodes are added/removed or as clients are added/removed from the system. These values may also account for other functions performed by the servers 202 that may not involve streams or that may not involve the particular resource being allocated. Further, these values may be able to vary based on other factors such as time of day. For example, when the processor is not required for other tasks such as during a slower period, it may be possible to temporarily increase the number of available streams.

Once the resource allocations have been defined and the server is allocating resources to the clients, the method 300 enforces or performs the allocation method. For example, a request for stream credits may be received 304. This request is evaluated as discussed previously to determine whether the requested allocation results in a safe allocation state. Thus, the server may evaluate 306 the stream state or the allocation state by hypothetically granting the request. This involves considering whether the other clients could still be allocated their maximum credits. As previously stated, in one embodiment, it is assumed that clients may ultimately request, use and release their maximum credits allowed. The evaluation thus determines what the allocation state would be if the request were granted.

The server then issues credits 308 according to the result (the determined allocation state) to the requesting client (and/or to other clients). If the allocation state is safe, the server may issue credits equal to the request or greater than equal to the request. If the allocation state is not safe, a partial grant may occur that still results in a safe allocation state. If the allocation state is not safe, the server may issue zero or negative credits. In one example, the zero and/or negative credits could be issued to any of the clients.

Figure 3B:
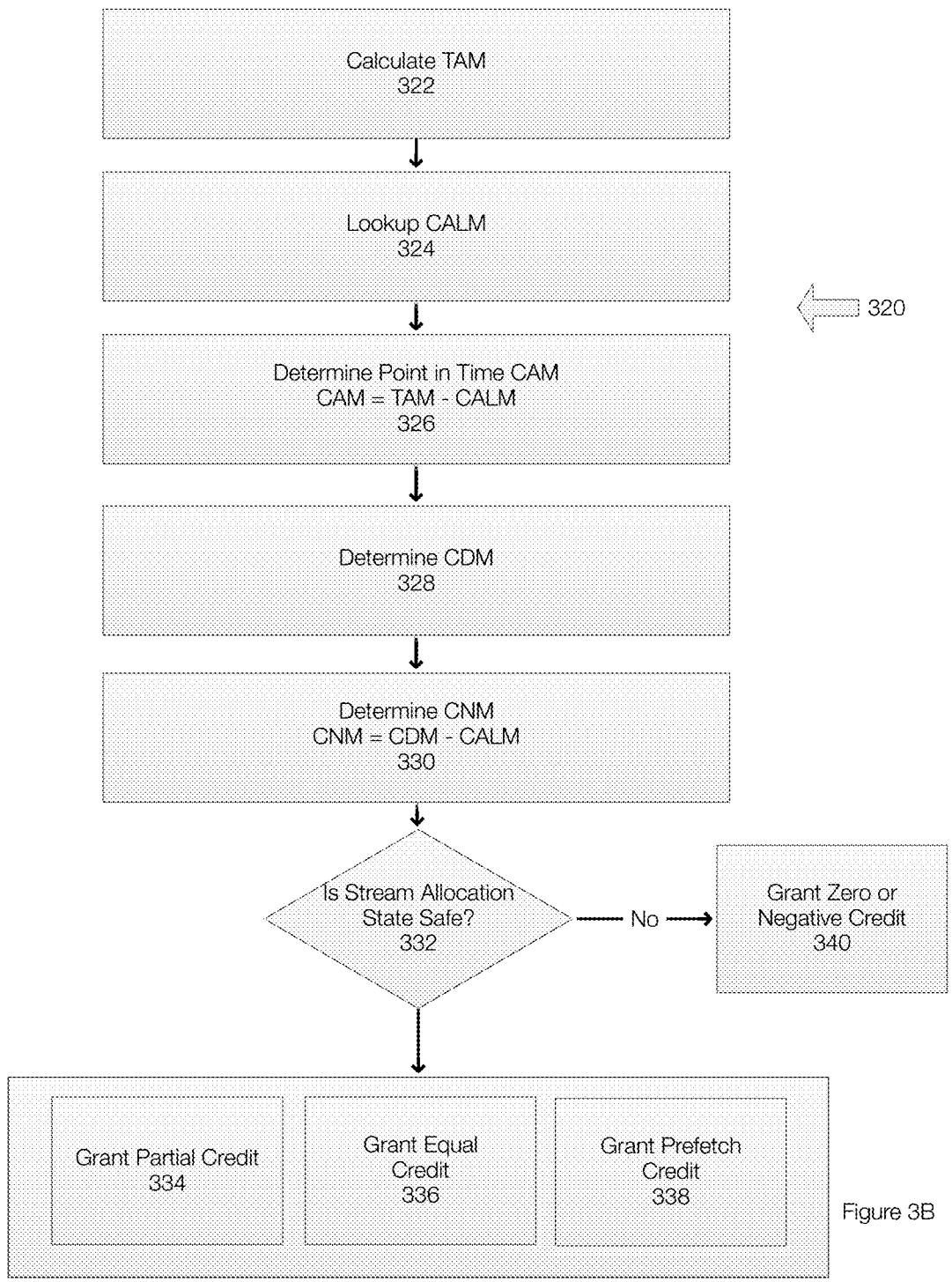
FIG. 3B illustrates an example of a method for evaluating a stream allocation state of a node or a server or a cluster.

FIG. 3B illustrates an example of evaluating the stream state in more detail. More specifically, FIG. 3B illustrates an example of evaluating the server stream state 306 shown in FIG. 3A. Thus, the method 320 illustrates an example of evaluating the server stream state 306. In an example of the method 320, the server may calculate the TAM 322, which determines the total streams available. The server may then lookup the CALM 324. The CALM identifies the streams that are currently allocated to the clients.

Next, the point in time CAM is determined 326. This is determined by subtracting the CALM from the TAM (CAM=TAM−CALM). This allows the server to determine how many streams are available for allocation. This can be determined from the perspective of the system as whole and/or on an per node or per server basis. As discussed above, the number of available streams may be determined on a per server basis. In one example, this ensures that the resources of a particular server are not overtaxed. Plus, in one embodiment, this may give the server or cluster flexibility in determining which servers provide or allocate resources. For example, it may be possible for a server to redirect a request to a different server if the redirection would result in a safe allocation state.

Next, the CDM is determined 328 and the CNMs determined 330 by subtracting the CALM from the CDM (CNM=CDM−CALM).

After this information has been determined, a determination 332 is made as to whether the stream allocation state is safe or unsafe. If the stream allocation state is not safe, then zero or negative credits are granted 340. If the stream allocation state is safe, then credits are granted. For example, partial credits may be granted 334, equal credits may be granted 336, or prefetch credits may be granted 338. The credits are then issued 308. In one example, issuing credits 308 may be part of the method 320 and is incorporated into the granting of credits 334, 336, 338 or 340.

Figure 3C:
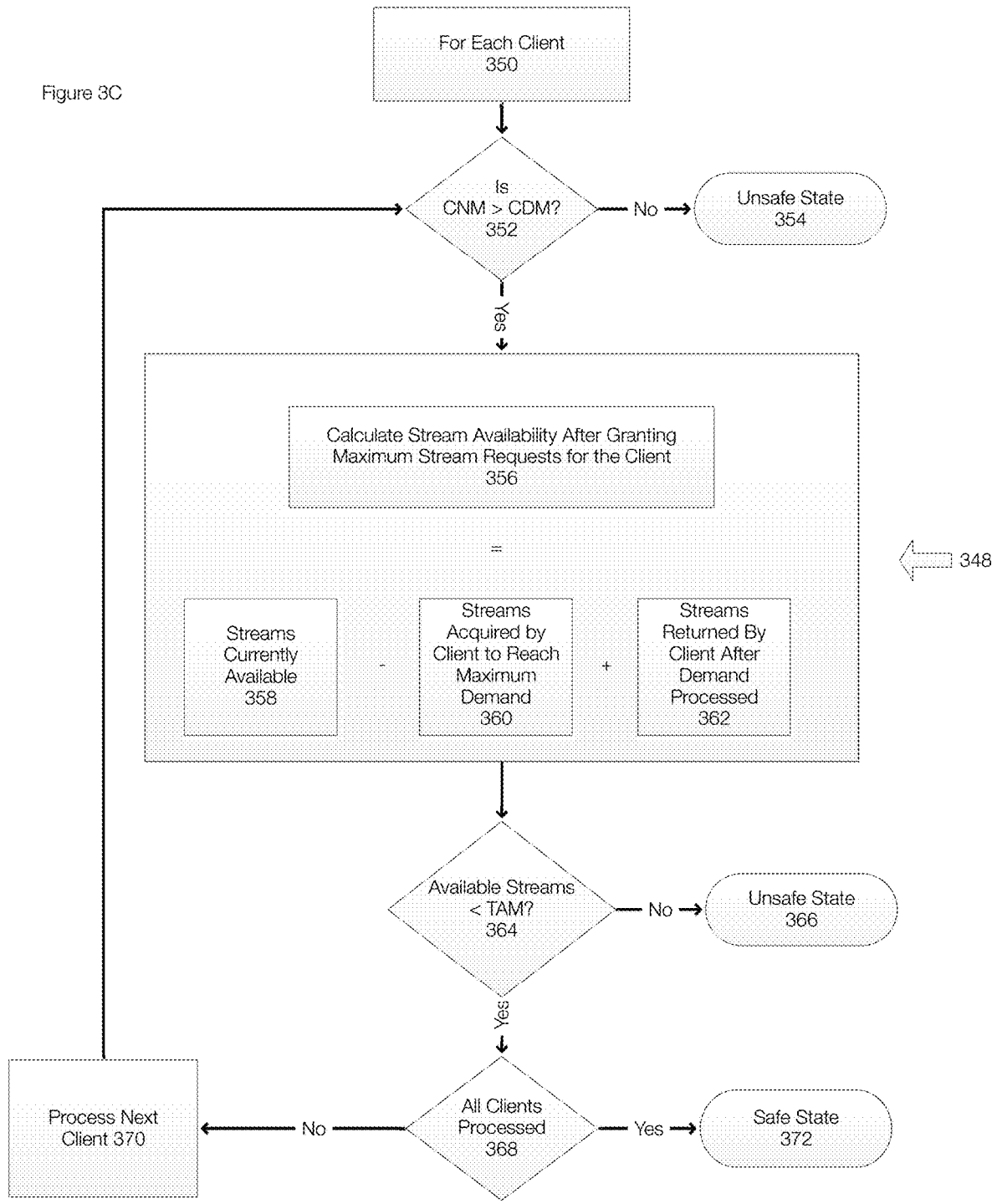
FIG. 3C further illustrates the method for evaluating the stream allocation state of FIG. 3B.

FIG. 3C illustrates an example of determining a stream allocation state. More specifically, FIG. 3C illustrates an example of determining if the stream allocation state is safe 332 in FIG. 3B. The method 348 may be performed for each client 350. Staring with a first client 350, a determination is made to determine 352 if CNM is greater than CDM. Thus, if the current need is not greater than the current demand, then the state is unsafe 354 and negative or zero credits are issued or granted as shown in FIG. 3B.

When the CNM is greater than the CDM, then the stream availability after granting the maximum stream requests for the client is determined 356. This computation may be performed as if the requested credits were granted to determine whether the resulting state is safe. Further, all clients, in one embodiment, are evaluated as a whole to determine whether the stream allocation state is safe.

In one example, the stream availability (356) is determined by subtracting the streams acquired by the client to reach the client's maximum demand 360 from the number of streams currently available 358 (this may be done as a whole or on a per server or node basis). This result is then added to the streams returned by the client after the demand is processed 362. In other words, the system evaluates the state assuming, in one example, that the clients requested and are granted their maximum possible streams.

Based on this determination 356, a determination is made as to whether the available streams is less than the total available matrix 364. If not, the state is unsafe 366. If so and all clients have been processed 368, the state is safe 372 and the credits can be granted as shown in FIG. 3B. If all clients are not processed, the next client is processed 370.

FIGS. 3A-3C thus illustrate an example of a method for allocating resources such that the allocation state of the system is safe. When a proposed allocation of resources (e.g., a request from a client) results in an unsafe allocation state, then the allocation may be zero or negative, which allows the system to either avoid an unsafe allocation state or return to a safe allocation state.

In addition to stream credits, embodiments of the invention relate to restore credits, which are another example of credits. A restore operation may involve reading data from a backup maintained by a backup server and transmitting or sending the data read from the backup to a restore location or device. In one example, the resource allocation systems and methods may rely solely on the restore credits, which may be defined in terms of data (e.g., 1 credit=256 MG or 500 MB, or 1 GB, etc., of data read), and/or on stream credits as previously described.

Restore credits improve the operation of a client or server by helping a client with their read ahead cache allocation/sizing, helping a client perform an intelligent read ahead, and improving the performance of the restore operation. In addition, embodiments of the invention help in restoring only data that is needed. This may avoid costs associated with data that is not needed for a restore operation.

More specifically, clients often implement read ahead caching and may read more data that is required. This may be a concern, for example, in a cloud environment, where the costs are determined per restore byte. In other words, reading more data than required can be expensive. Embodiments of the invention allow the read ahead cache or buffer of a client to be sized or tuned based on the size of the data being restored. This is useful because, in one example, the client may not know the size of the data to be restored. The server can aid in the allocation and size of the client read ahead cache by providing prefetch restore credits.

Figure 4:
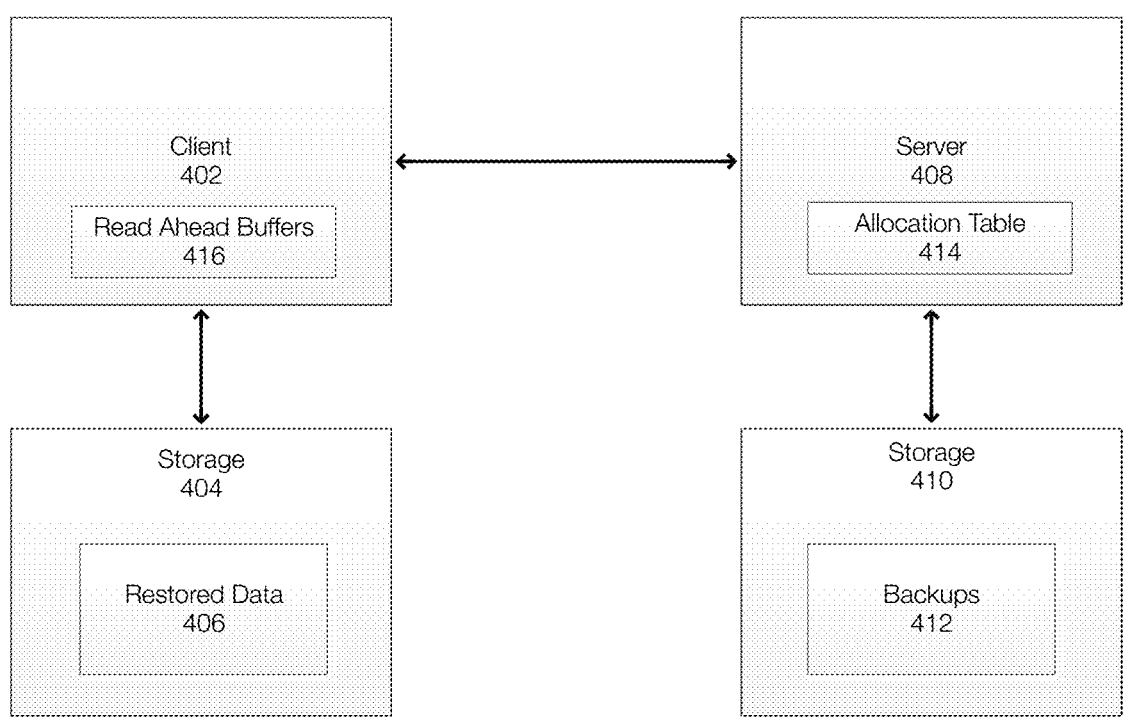
FIG. 4 illustrates an example of a system in which restore credits are allocated to requesting clients.

FIG. 4, for example, illustrates an example of a client performing a restore operation using restore credits and/or stream credits. The server (or a cluster) may be able to support multiple clients using restore and/or stream credits.

In FIG. 4, a client 402 is restoring restored data 406 to storage 404 (or other device/machine). The restored data 406 may be a database, a virtual machine, a file system, or the like. When performing the restore operation, the restored data 4006 is restored from the backups 412 (e.g., a particular backup). Data read from the backups 412 is thus read by the server 408 and transmitted to the client 402. The client then writes the data to the restored data 406.

In this example, the client 402 may request restore credits from the server 408 (e.g., a backup server). The server 408 may maintain an allocation table 414 that allows restore credits and/or stream credits to be tracked. In this example, the client 402 does not know the size of the dataset to be restored. The server 408, however, may know the size of the dataset because this context is present on the server 408

Assume, by way of example only, that 256 MB of data is associated with one credit of restore, the following scenarios may occur. The client 402 desire to read 1 GB of data and may therefore request 4 restore credits from the server 408. The client may also set a "prefetch" flag, which indicates to the server 408 that this is a sequential restore and that the server could grand more credits than requested. If the dataset to be restored is 4 GB, the server 408 may grant 16 restore credits to the client 402 even though 4 restore credits were requested.

The number of restore credits granted to the client 402 can be used to adjust the size of the client's read ahead cache buffers 416. For example, a large number of credits may cause the client 402 to increase the size of the read ahead buffer or cache to a size that can accommodate the amount of data associated with the granted credits. Alternatively, the buffers 416 may be sized in a manner that accounts for a rate at which the cached data is restored to the restored data 406. In one example, the size of the buffers 416 may dynamically adapt to the number of credits held by the client 402.

If the restore operation were to occur in a cloud environment, the server 408 may ignore the prefetch flag and choose to grant the number restore credits in the amount requested by the client. This may be done because reading ahead and restoring or reading more data than needed can be expensive in a cloud environment.

The number of restore credits granted by the server 408 can be granted in a manner that is similar to the manner in which stream credits are granted. The granted amount of restore credits can be equal to the number of restore credits requested, less than the number of restore credits requested, greater than the number of credits requested by the client, zero, or negative.

Depending on the number of restore credits received by the client 402, the client 402 would use the restore credits to perform restore operations. The restore credits are used to read data and, as the data is read, the restore credits are accordingly used or returned. Use of each chunk of reads would result in using of each Restore credits.

If the number of restore credits granted is zero or a negative value, it is an indication to the client to throttle. Consequently, the restore request cannot be performed (or may only be partially performed) and restore credits are returned by the client to the server. This allows the server to achieve a safe allocation state.

If the restore operation has been completed and if the client 402 has additional restore credits cached in its connection structure, the client 402 can choose to unilaterally release the those restore credits. The server 408 may update its internal credit accounting database, the allocation table 414, to account for release of the restore credits from a particular client.

When granting credits (regardless of type), the server 408 may perform a credit allocation method. Embodiments of the invention contemplate that many metrics can be used in determining the credit allocation or the credit allocation state. Examples include, machine capabilities (connections, processors, cores, memory size, memory types, client connections, existing streams, available resources, and the like or combination thereof.

Figure 5:
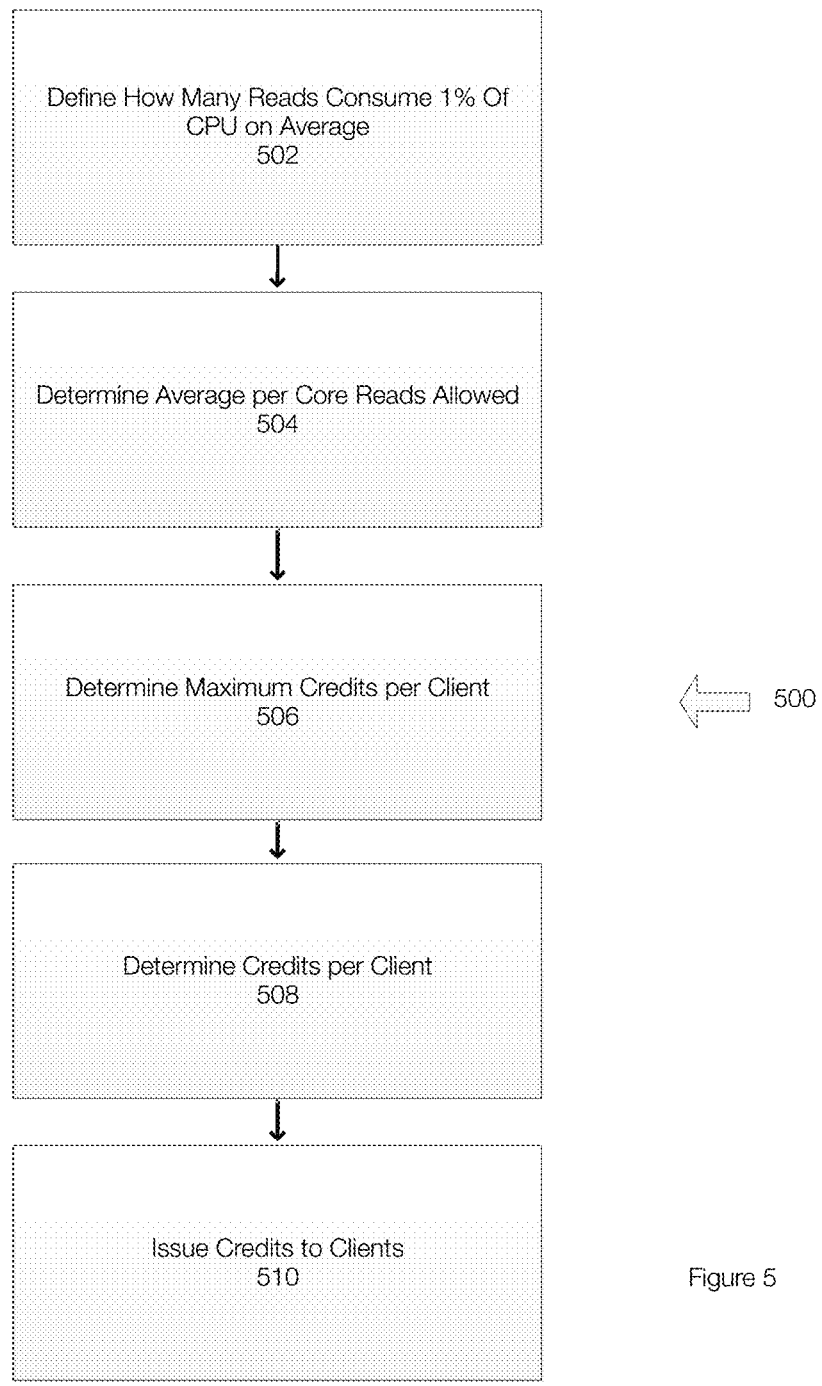
FIG. 5 is a flow diagram illustrating an example of a method for performing resource allocation during a data protection operation such as a restore operation.

FIG. 5 illustrates an example of a method for allocating restore credits. The method 500 may include steps or acts that are not performed each time the method is performed. In FIG. 5, the amount or number of reads that consume 1% of a processor or core (e.g., a CPU or central processing unit) on average is determined or defined 502. While this number is typically an approximation, gathering statistical data by doing empirical restore of data can be used to qualify this number. The percentage of CPU utilization during various restore runs or operations of different sizes and/or data types can be obtained or measured. The average, for example, of these observations can be used to calculate number of reads that consume 1% of data. For example, if it is observed observe that restoring 1 GB of data consumes 10% CPU and results in 10,000 read requests on average, it can be approximated that 1000 read requests to the server, consume 1% of CPU. This result may be used to determine the number of restore credits to be allocated to requesting clients.

Next, the average number of per core reads allowed is determined 504. In one example, this is determined by multiplying the number of reads that consume 1% of the CPU with the average percentage of free CPU per core. If the average percentage of free CPU per core is less than a threshold (e.g., 2%), then the credits granted to all clients is zero or negative.

Next, the maximum credits per client are determined 506. This may be determined by multiplying the average per core reads allowed with the number of CPU cores and then dividing by the number of client connections. The maximum credits per client represents the maximum number of credits that a client may acquire.

The allocation table accounts for credits that have already been issued to the client. For example, if a client's maximum credits is 100 and 60 have already been granted, a request for 50 restore credits may result in a grant of partial credits or zero credits or negative credits. The allocation table is updated as credits are granted, released, etc.

In one example, the number of credits per client are determined 508. This is distinct from the maximum credits because this act or step may account for a tuning factor that can be adjusted or is configurable. The tuning factor allows embodiments of the invention to factor in a reserve value into the resources being allocated. The tuning factor may be 50-70% of the maximum restore credits.

Next, credits may be issued to requesting clients 510. The number of credits issued may be determined, by way of example, only by using the minimum of the restore credits requested and the calculated credits per client. If the client has requested prefetch, then the number of restore credits issued may be a maximum of the requested restore credits and the calculated credits per client.

Consider the following example. If the number of reads that consume 1% of the CPU on average is 1000 and the average percentage of free CPU per core is 50%, then the average per core reads allowed is ((1000*0.5)=500). If the number of CPU cores is 4 and the number of clients is 10, then the maximum credits per client is ((500*4)/10=200). If the tuning factor is 50%, then the calculated credits per client is (200*0.5=100). Thus, there is a distinction between the maximum credits per client and the tuned or calculated credits per client.

If a client then requests 40 restore credits, the granted restore credits is MIN(40,100)=40. Thus 40 credits are granted. If the client requests prefetch, then the granted credits is MAX(40,100)=100. Thus 100 credits are granted. If restoring from the cloud, the prefetch may be ignored, in which case the granted credits may be 40 in this example.

Each time restore credits are requested, embodiments of the invention may ensure that the grant does not result in an unsafe allocation state. For example, requesting credits that exceeds a client's maximum credits may result in an unsafe allocation state. Further, the credits already used by the client and other clients may also be considered when granting credits. Also, when determining the allocation state, the average percentage of free CPU per core may be determined. If the grant drops the average percentage of free CPU below a threshold, then the grant may be for zero credits or negative credits.

In another example, the restore credits can be managed in a manner similar to the stream credits such that each request for restore credits is considered in the context of all available restore credits rather than each client's maximum allowed clients or calculated restore credits based on the tuning factor.

In one example, restore credits are an example of stream credits at least because the data being restored is also streamed from the server to the clients. However, these credit types can also be used together. For example, the stream credits can be used to manage the number of streams and the restore credits may determine how much data a particular client can read for all of the client's streams.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for allocating resources of a server to clients connected to the server, the method comprising:
   receiving a request for stream credits from a client, wherein the stream credits each correspond to an amount of data to read from the server;
   determining a number of credits available to the client, wherein the number of credits available to the client accounts for stream credits already issued to the client;
   determining whether granting the request for the stream credits results in a safe allocation state for all of the clients including the requesting client by considering the ability of the other clients to acquire stream credits if the request for the stream credits is granted; and
   issuing credits based on the request and based on whether granting the request results in the safe allocation state for all of the clients including the requesting client.

2. The method of claim 1, wherein the safe allocation state allows all of the clients to acquire and their maximum stream credits.

3. The method of claim 1, wherein the safe allocation state allows all of the client to acquire their maximum stream credits, use the stream credits, and release the stream credits.

4. The method of claim 3, further comprising:
   issuing stream credits equal to a number of stream credits requested by the client;
   issuing stream credits greater than the number of stream credits requested by the client;
   issuing stream credits less than the number of stream credits requested by the client;
   issuing zero stream credits to the client; or
   issuing negative stream credits to the client.

5. The method of claim 4, wherein issuing of zero or negative restore credits causes stream credits being held by the client to be released.

6. The method of claim 5, wherein causing the client to released stream credits results in the safe allocation state for the client.

7. The method of claim 1, wherein receiving the request from a client includes a prefetch flag wherein a prefetch flag indicates the server could grant more stream credits than the number of credits originally indicated by the received request.

8. The method of claim 7, wherein the server grants or ignores additional stream credits as indicated by the prefetch flag.

9. The method of claim 1, wherein the stream credits are restore credits for facilitating a restore operation by reading data from a backup maintained by a backup server and transmitting the data read from a backup maintained by a backup to restore a device.

10. The method of claim 9, further comprising receiving restore credits from a client wherein the client unilaterally released the restore credits after completing the restore operation.

11. A non-transitory computer readable medium including computer readable instructions for implementing a method, when executed, for allocating resources of a server to clients connected to the server, the method comprising:
   receiving a request for stream credits from a client, wherein the stream credits each correspond to an amount of data to read from the server;
   determining a number of credits available to the client, wherein the number of credits available to the client accounts for stream credits already issued to the client;
   determining whether granting the request for the stream credits results in a safe allocation state for all of the clients including the requesting client, by considering the ability of the other clients to acquire stream credits if the request by the client for the stream credits is granted; and
   issuing credits based on the request and based on whether granting the request results in the safe allocation state for all of the clients including the requesting client.

12. The non-transitory medium of claim 11, further comprising redirecting the request to another server if the redirection would result in a safe allocations state.

13. The non-transitory medium of claim 11, further comprising issuing credits based on the request and based on whether granting the request results in the safe allocation state for all of the clients.

14. The non-transitory medium of claim 13, wherein the safe allocation state allows all of the clients to acquire and their maximum stream credits.

15. The non-transitory medium of claim 13, wherein the safe allocation state allows all of the client to acquire their maximum stream credits, use the stream credits, and release the stream credits.

16. The non-transitory medium of claim 15, further comprising:
   issuing stream credits equal to a number of stream credits requested by the client;
   issuing stream credits greater than the number of stream credits requested by the client;
   issuing stream credits less than the number of stream credits requested by the client;
   issuing zero stream credits to the client; or
   issuing negative stream credits to the client.

17. The non-transitory medium of claim 16, wherein issuing of zero or negative restore credits causes stream credits being held by the client to be released.

18. The non-transitory medium of claim 17, wherein causing the client to released stream credits results in the safe allocation state for the client.

19. The method of claim 11, wherein receiving a request from a client includes a prefetch flag wherein a prefetch flag indicates the server could grant more stream credits than the number of credits originally indicated by the received request.

20. The method of claim 11, wherein the server grants or ignores additional stream credits as indicated by the prefetch flag.

* * * * *